United States Patent
Hill

(10) Patent No.: US 6,345,680 B1
(45) Date of Patent: Feb. 12, 2002

(54) ELECTRONICALLY-CONTROLLED ADJUSTABLE HEIGHT BEARING SUPPORT BRACKET

(75) Inventor: James D. Hill, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/351,435

(22) Filed: Jul. 12, 1999

(51) Int. Cl.[7] ............................................. B60K 17/22
(52) U.S. Cl. ........................ 180/376; 180/377; 180/379; 180/380; 180/209; 254/92; 74/89.15; 248/157
(58) Field of Search ................................... 180/376, 377, 180/379, 380, 70, 312, 75.2, 338, 381, 21, 209; 248/422, 157; 254/92; 74/89.15; 280/348

(56) References Cited

U.S. PATENT DOCUMENTS

| | | | |
|---|---|---|---|
| 277,157 A | | 5/1883 | Pearce |
| 1,032,244 A | | 7/1912 | Ryder |
| 3,037,613 A | | 6/1962 | Harmon |
| 3,722,613 A | * | 3/1973 | De Priester et al. .... 180/338 X |
| 3,759,340 A | * | 9/1973 | Schilter ........................ 180/53 |
| 3,848,932 A | | 11/1974 | Lewis |
| 4,135,390 A | | 1/1979 | Templin |
| 4,328,877 A | * | 5/1982 | Ballard ...................... 180/75.2 |
| 4,569,559 A | | 2/1986 | Fulmer |
| 4,650,258 A | | 3/1987 | Schenten |
| 4,770,438 A | | 9/1988 | Sugasawa et al. |
| 4,778,026 A | * | 10/1988 | Uchida et al. ............. 180/75.2 |
| 4,887,840 A | | 12/1989 | Harara et al. |
| 4,971,353 A | | 11/1990 | Buma et al. |
| 4,986,609 A | | 1/1991 | Cole et al. |
| 5,081,800 A | * | 1/1992 | Ruholl ....................... 180/377 |
| 5,087,072 A | | 2/1992 | Kawarasaki |
| 5,154,492 A | | 10/1992 | Levrai et al. |
| 5,201,572 A | | 4/1993 | Castel |
| 5,343,972 A | * | 9/1994 | Balmer ...................... 180/209 |
| 5,370,464 A | | 12/1994 | Blaha |
| 5,495,905 A | * | 3/1996 | Finim, Jr. ............... 180/348 X |
| 5,562,179 A | | 10/1996 | McAdam |
| 5,630,625 A | * | 5/1997 | Shaw ......................... 180/209 |

FOREIGN PATENT DOCUMENTS

| | | | | |
|---|---|---|---|---|
| DE | 3305437 | * | 2/1983 | ............ 180/209 X |
| DE | 4223855 | * | 7/1992 | ............ 180/377 X |
| EP | 0412068 | * | 6/1991 | ............ 180/209 X |
| JP | 584633 | * | 1/1983 | ............ 180/209 X |
| JP | 321522 | * | 3/1991 | ............ 180/209 X |

* cited by examiner

Primary Examiner—Lanna Mai
Assistant Examiner—Toan To
(74) Attorney, Agent, or Firm—Mark P. Calcaterra; Ralph E. Smith

(57) ABSTRACT

An electronically-controlled adjustable height bearing support bracket is provided. In a preferred embodiment, the bearing support bracket supports a rear end of a front drive shaft of an automotive drive train with a multiple piece drive shaft. A driver is provided to adjust the height of the bearing support bracket based upon the loading conditions of the vehicle. The bearing support bracket height is adjusted to minimize the angle between the front and rear drive shafts during conditions of high torque transfer of the drive train to minimize launch shudder in the vehicle.

20 Claims, 2 Drawing Sheets

ELECTRONICALLY-CONTROLLED ADJUSTABLE HEIGHT BEARING SUPPORT BRACKET

BACKGROUND OF THE INVENTION

FIELD OF THE INVENTION

This invention relates in general to drive train assemblies for transferring rotational power from an engine to an axle assembly in a vehicle. In particular, this invention relates to an electronically-controlled adjustable-height bearing support bracket for the bearing support of a multiple piece drive shaft and to a vehicle which incorporates such a bearing support bracket.

DESCRIPTION OF PRIOR DEVELOPMENTS

In most light trucks and vans in use today, a drive train assembly is provided for transmitting rotational power from an output shaft of a transmission to an input shaft of an axle assembly so as to rotatably drive one or more wheels of the vehicle. To accomplish this, a typical light truck or van drive train assembly includes front and rear cylindrical drive shafts. A first universal joint is connected between the output shaft of the transmission and a first end of the front drive shaft. A second universal joint is connected between a second end of the front drive shaft and rear drive shaft. A third universal joint is connected between the rear drive shaft and the differential input shaft of the rear axle assembly. The universal joints provide a rotational driving connection from the output shaft of the transmission through the front and rear drive shafts to the input shaft of the differential, while accommodating angular misalignment between the rotational axis of these four shafts.

Not only must the drive train assembly accommodate a limited amount of angular misalignment between the transmission and the differential input shaft, but it must also typically accommodate a limited amount of axial movement therebetween. A small amount of such relative axial movement frequently occurs when the vehicle is operated. To address this, it is known to provide one or more slip yoke assemblies in the drive train assembly. A typical slip yoke assembly includes first and second splined members which are connected to respective components of the drive train assembly.

A first slip yoke assembly is located between the front end of the front drive shaft and the output shaft of the transmission. A second slip yoke assembly is positioned on the rear end of the front drive shaft and the second universal joint that connects the front drive shaft with the rear drive shaft.

The engine and transmission of a vehicle are typically fixed with respect to the frame of the vehicle. However, the differential on the rear axle moves with respect to the frame of the vehicle primarily due to the loading of the vehicle. In most vehicles having a front and rear drive shaft, the rear portion of the front drive shaft is supported by a bearing which is suspended from the frame of the vehicle.

When the vehicle only has a single occupant and is unloaded, the rear drive shaft typically angles vertically downward from the universal joint connecting the front and rear drive shafts. When a vehicle is fully loaded, the springs which mount the rear axle to the vehicle frame are compressed and therefore the rear drive axle will incline upwardly from the universal joint connecting the rear drive shaft to the front drive shaft.

Conventional universal joints allow two connected shafts to rotate with one another at the same average velocity. When a torque is transmitted at an angle a bending moment is produced. This bending moment is called a secondary couple. In a drive shaft, the secondary couples react on the supporting structure. In the case of a pick-up or van type vehicle with a two piece drive train, the universal cardan joints are transmitting torque, at an angle. The secondary couple produces a dynamic oscillatory load to the supporting structure at a frequency of twice the speed of revolution.

In the two piece drive shaft this vibration is mostly transmitted through the center bearing and is felt like shaking or shudder. In the two piece drive train with the three universal joints, each joint will produce an oscillating secondary couple. Minimizing the three angles (at the universal joints) will reduce the shudder at the center bearing. Another way of minimizing the shudder is by arranging the three universal joint angles in such a way that the reacting forces of the three-cardan joints cancel each other. The change of the angles can be performed by changing the position of the center bearing.

For a live rear suspension where the rear axle position relative to the body changes depending on the vehicle load, designing a two piece drive train for minimum shudder is impossible with a fixed center bearing position. If the center bearing could move to compensate for axle movement, cancellation of the reaction forces on the center bearing could be achieved at various vehicle loadings.

Launch shudder is most notable when a vehicle initially accelerates and is a function of the torque transfer between the transmission and the drive axle. When accelerating from a stopped position, the torque transfer between the engine of the vehicle and rear wheels is typically the greatest. The greater the torque transfer and the greater the angle between the front drive shaft and the rear drive shaft, the greater will be the generation of launch shudder. In many large vehicles, launch shudder is ignored since it does not materially function to damage any components of the drive train. However, in minivans, light trucks or vans which have a chassis of a light truck or pickup truck, launch shudder can be displeasing to a vehicle occupant.

To minimize launch shudder, the position of the bearing which supports the rear end of the front drive shaft is selected such that the angles between the front drive shaft and the rear drive shaft (as much as possible) approaches an ideal 180°, that is, a straight line. However, as mentioned previously, the angles between the front drive shaft and rear drive shaft are also dependent upon the loading of the vehicle. Therefore, in most vehicles the bearing support is placed at a theorized, ideal location which is somewhere between the extremes of the suspension system which are defined when the vehicle is loaded fully or when the vehicle is at its lightest with a single vehicle occupant. Extreme departures from this ideal setting, such as when the vehicle has its seats removed for the addition of cargo and there is only one vehicle occupant, or in conditions when the vehicle is fully occupied and loaded to its maximum capacity, bring about situations which can inadvertently facilitate the generation of launch shudder upon acceleration of the vehicle. Additionally, launch shudder can also be introduced when the vehicle is already moving and thereafter undergoes an extreme acceleration.

Launch shudder can be reduced by the utilization of constant velocity universal joints. In a constant velocity universal joint the secondary couple that is produced does not oscillate with the revolution of the shaft but is constant. Constant velocity joints have been found to greatly reduce launch shudder. However, constant velocity universal joints substantially increase the cost of the drive train. In practice, constant velocity joints have been combined with conventional universal joints in a common drive shaft as a compromise solution in regards to cost. Such drive trains exhibit launch shudder although with a reduced intensity. Still the reduced level of launch shudder can be undesirable to a vehicle occupant.

It is desirable to find a method to substantially reduce or eliminate launch shudder at a lower expense than the utilization of constant velocity universal joints in the drive train.

SUMMARY OF THE INVENTION

The present invention has been developed to meet the above-noted objects. In a preferred embodiment of the present invention, provides a mechanism that a powered driver adjusts the height of a bearing support bracket. The bearing support bracket can be adjusted based upon the angle between first and second drive shafts to reduce the angle in order to minimize launch shudder. In a preferred embodiment, the driver which adjusts the height of the bearing bracket is controlled by a controller which receives data of the angles between the front and rear drive shafts and the torque condition of the drive train.

It is an object of the present invention to provide a vehicle drive train with reduced launch shudder. It is another object of the present invention to provide a drive train with reduced launch shudder accomplished by the adjustment of the bearing support bracket which supports the front drive shaft in a two-piece drive shaft. It is also an object of the present invention to provide a drive shaft arrangement which reduces launch shudder without the utilization of constant velocity universal joints. Still another object of the present invention is to provide a drive train with an adjustable-height bearing support bracket which is controlled in relationship to the cargo load and/or rear suspension height.

The above noted features and other advantages of the present invention will become more apparent to those skilled in the art as the invention is further explained in the accompanying drawings and detailed description.

DETAILED DESCRIPTION OF THE DRAWINGS

Figure 1:
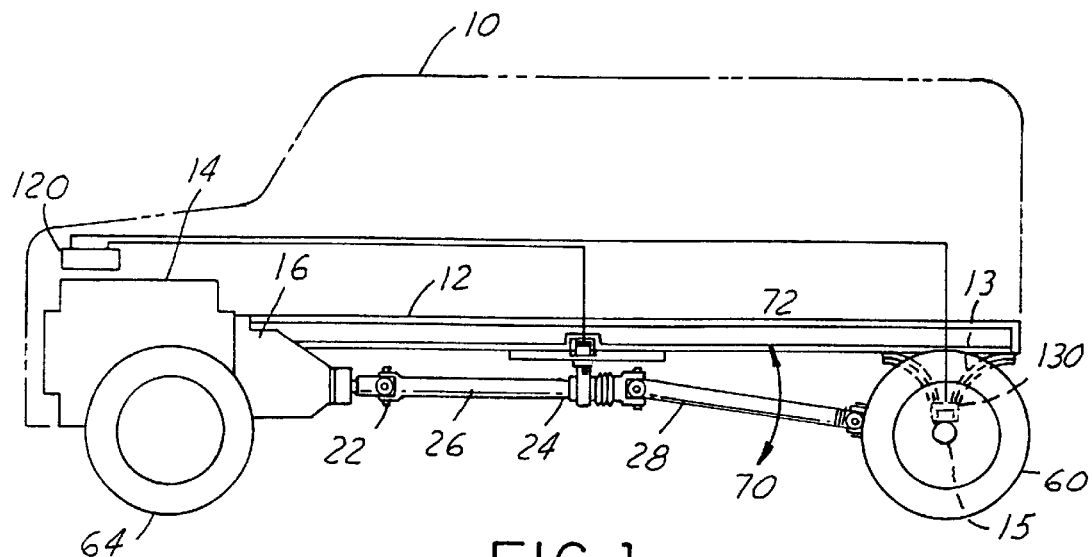
FIG. 1 is a side elevation view of a preferred embodiment of an adjustable height center bearing support bracket according to the present invention.

Referring to FIG. 1, an automotive vehicle 10 typically a van or other vehicle, is provided on a truck-like chassis. The vehicle 10 has a frame 12. The frame 12 has connected therewith via suitable vibration insulators, an engine 14. The engine 14 has an output shaft (not shown) which is coupled to an input shaft (not shown) of a vehicle transmission 16. The vehicle transmission 16 has a housing which is fixed with the engine 14 and the frame 12.

Figure 2:
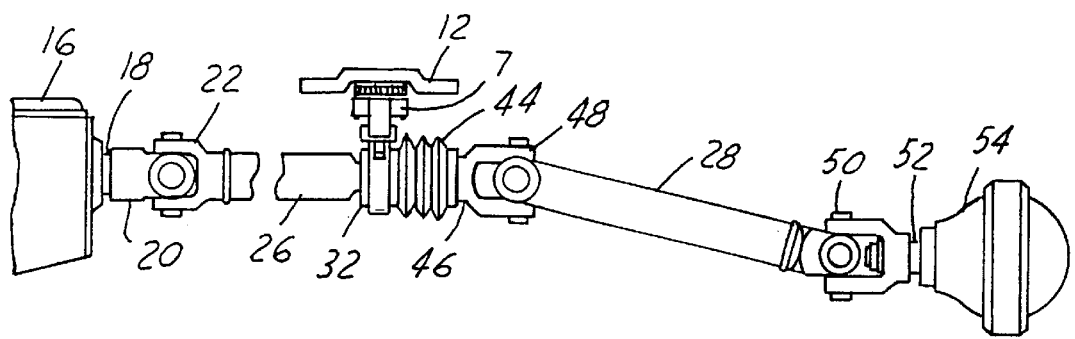
FIG. 2 is an enlargement of a portion of the electronically-controlled adjustable height center bearing support bracket shown in FIG. 1.

Referring additionally to FIG. 2, the vehicle transmission 16 has an output shaft 18. The output shaft 18 is splined to allow a slip collar 20 to slide axially thereupon. The slip collar internal diameter is also splined to allow torque transfer between the transmission output shaft and the collar 20. The collar 20 on its opposite end is coupled by a first universal joint 22 to a front end of a two piece drive shaft 24. The drive shaft 24 has a front shaft or piece 26 and a rear shaft or piece 28. The drive shaft front piece is supported at its rearward end by a bearing 32.

Figure 4:
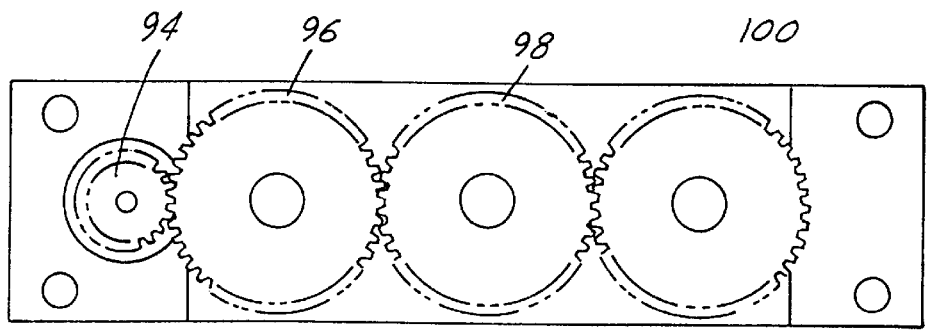
FIG. 4 is a top plan view of the driver shown in FIG. 3.
Figure 5:
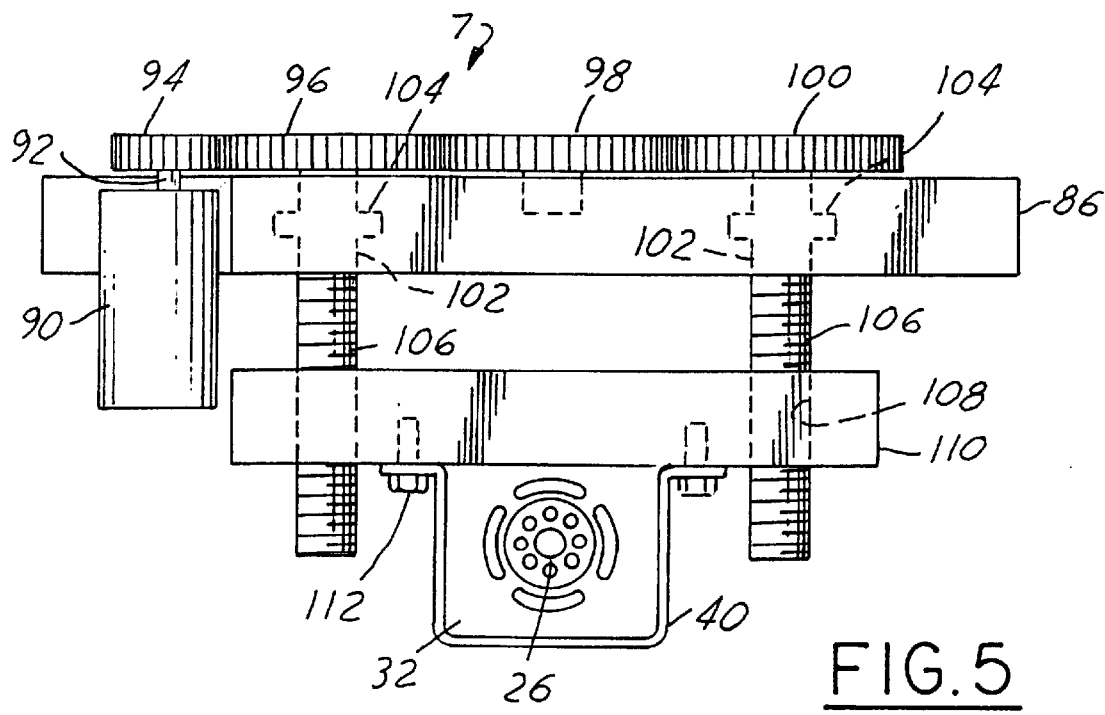
FIG. 5 is an elevation view of the preferred embodiment of the present invention.

The bearing 32 is supported by a hanger 40 as best shown in FIGS. 4 and 5. The front drive shaft 26 has a splined end which is encircled by a grease boot 44. A slip collar 46 has an internal spline which mates with the splined end of the first drive shaft 26. The slip collar 46 is integrally connected with a second universal joint 48. The second universal joint 48 is also connected with the second or rear drive shaft 28. The rear drive shaft 28 is connected with a third universal joint 50. Universal joint 50 is torsionally associated with input shaft 52 of the differential 54. The differential 54 is connected with a drive axle which powers wheels 60.

As mentioned previously, the engine 14 and transmission 16 are generally fixed with respect to the vehicle frame 12. The front wheels 64 are suspended from the frame 12 by a suspension system (13). The rear wheels 60 and their associated drive axle 15 are spaced away from the frame 12 by a rear suspension (not shown). Due to loading conditions or the inclination of the surface upon which the vehicle 10 is driven, the angular position between the drive shaft 26 and drive shaft 28 may vary. When vehicle 10 is unloaded and only occupied by one passenger, drive shaft 28 will tend to be pivoted towards the direction of arrow 70. When the vehicle is fully loaded with occupants and cargo, the position of the drive shaft 28 will tend to pivot towards the direction of arrow 72.

It is apparent to those skilled in the art, that it is typically preferable that the angle between the first drive shaft 26 and second drive shaft 28 be as close as possible to 18° for optimal operational conditions to minimize launch shudder. The optimum angle between the first drive shaft 26 and the second drive shaft 28 is also dependent upon the angle between the first drive shaft 26 and the transmission output shaft 18 and the angle between the second drive shaft 28 and input shaft 52 of the differential.

Figure 3:
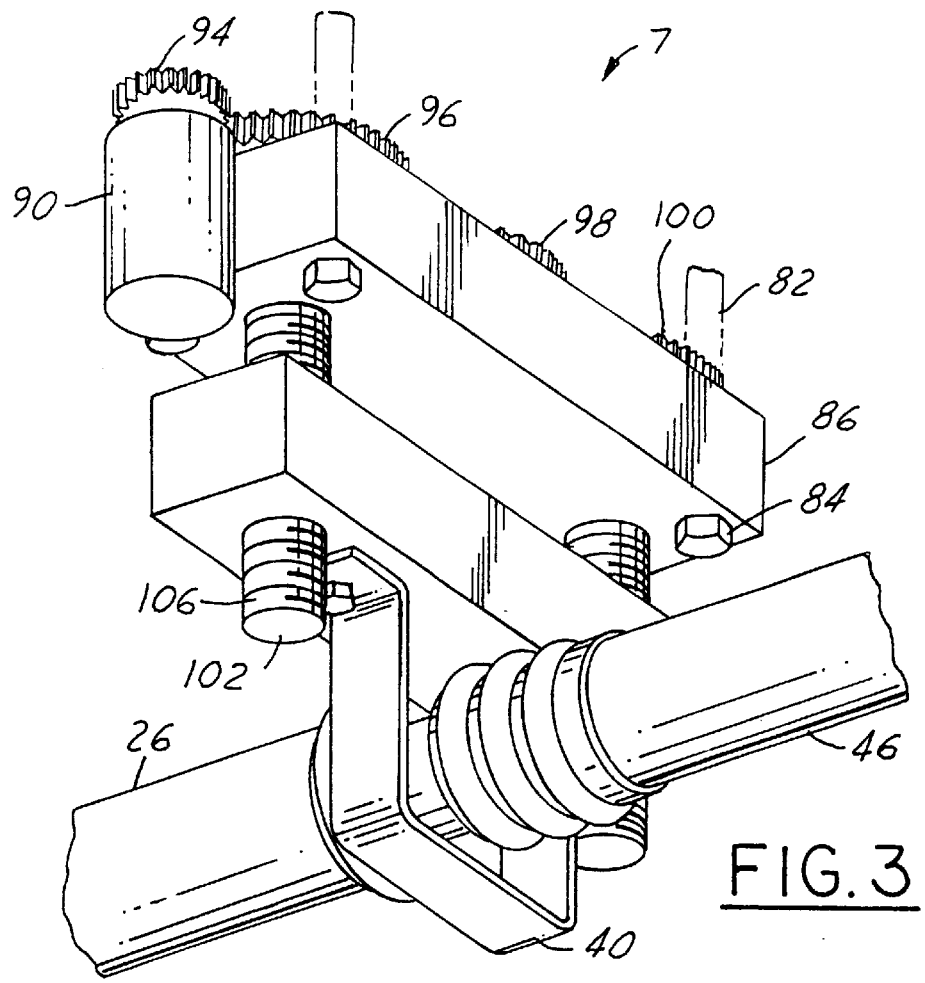
FIG. 3 is a perspective enlargement of a driver utilized in the present invention with the center bearing being removed for clarity of illustration.

To adjust the angle between the first drive shaft 26 and the second drive shaft 28, there is provided a driver 7. Referring additionally to FIGS. 3, 4 and 5, the driver 7 is connected to a portion of the frame 12 by bolts 82. The bolts 82 have heads 84 which abut an upper plate 86. The upper plate 86 supports an electric motor 90. The electric motor has a shaft 92. The shaft 92 is connected to a driver gear 94. Driver gear 94 is meshed with driven gear 96. Driven gear 96 is meshed with idler gear 98. Idler gear 98 is meshed with driven gear 100.

The driven gears 96 and 100 rotate in a common rotational direction and are both connected to shafts 102. Shafts 102 are connected to thrust bearing 104 which, in a conventional manner, mounts the shafts 104 within the upper block 86. The shafts 102 have a threaded portion or worm gears 106 which are threadably engaged with a threaded bore 108 provided in a lower block 110. A set of bolts 112 connect the hanger 40 with the lower block 110. The hanger 40 suspends the bearing 32 (removed from FIG. 3 for clarity of illustration). The lower block may alternately be translated up and down by a lever, cam or air-spring arrangement.

In operation, when the vehicle is unloaded with only one vehicle occupant, the second drive shaft 28 will be pivoted in the direction of arrow 70 by the spring of the rear axle suspension system. An electronic controller 120 receives data values which determines the angle between the first drive shaft 26 and the second drive shaft 28 from a signal given by a brake proportioning valve 130. The brake proportioning valve 130 (when the vehicle 10 is stopped and the engine 14 is on) will sense the cargo loading or height of the rear suspension system. A signal representative of the cargo loading or suspension height is then relayed to the controller 120. The controller 120 interprets the signal to determine the angle between the first 26 and second drive shafts 28.

Prior to acceleration of the vehicle, the controller 120 will signal the motor 90 to rotate in a first rotative direction to cause the gear train comprising gears 94, 96, 98, 100 and 106 to rotate in such a fashion to lower the lower plate 110 and effectively lowering the drive shaft bearing 32. The angle between the first drive shaft 26 and the rear drive shaft 28 will approach the ideal drive shaft angle to reduce vehicle shudder. The ideal angle will be a factor of all four axes of the drive train. Typically the ideal axis will minimize the angle between the first 26 and second drive shafts 28 and approach 180°.

In the example shown in FIG. 1, the controller 120 will cut off the driver 7 whenever the vehicle 10 is moving or if the engine 14 is off. Therefore, road conditions will not cause an adjustment in the center bearing height and center bearing height will only be adjusted during "launch" of the vehicle. In alternative embodiments, controller 120 can be programmed to optionally cut off upon operator command or to cut off or to operate based upon the torque sensed in the vehicle engine and transmission. Additionally, the controller 120 can be optionally programmed to operate the driver 7 whenever the angle between the first drive shaft 26 and the second drive shaft 28 deviates from a certain preselected angular range. The controller 120 can also be programmed to not function when the vehicle reaches a certain preselected speed or if the torque level experienced by the engine or transmission does not meet a certain preselected value or on occasions wherein the angular position of the second drive shaft 28 has changed in a very short period of time indicative of response of the drive shaft to transient road conditions versus loading conditions of the vehicle 10.

When the vehicle is fully loaded, the rear drive shaft 28 will pivot in the direction of arrow 72. Prior to acceleration from a standstill position, the controller 120 will signal the driver 7 to cause the reversible motor 90 to raise the bearing 32 to bring the angle between the front 26 and rear 28 drive shafts to be as close as possible to an ideal angle as previously described.

While a preferred embodiment of the present invention has been disclosed, it is to be understood that it has been described by way of example only and that various modifications can be made without departing from the spirit and scope of the invention as it is encompassed in the following claims.

I claim:

1. An apparatus adapted to adjust a drive shaft in a vehicle, said apparatus comprising:
   a powered driver between the vehicle and the drive shaft; and
   a bearing supporting the drive shaft, said bearing being moved relative to the vehicle by said driver to adjust the angular position of the drive shaft.

2. An apparatus as described in claim 1, wherein said driver is powered by an electric motor.

3. An apparatus as described in claim 1, wherein said driver includes a gear train.

4. An apparatus as described in claim 3, wherein said gear train includes a worm gear.

5. An apparatus as described in claim 1, wherein said drive shaft includes at least first and second pieces.

6. An apparatus as described in claim 1, wherein said driver translates said bearing vertically up and down.

7. An apparatus adapted to adjust a drive shaft of a vehicle, said apparatus comprising:
   a powered driver carried on the vehicle for translating the drive shaft;
   a bearing being moved relative to the vehicle by said driver and supporting the drive shaft, the drive shaft includes at least first and second pieces,
   wherein the driver adjusts an angle between the first and second drive shaft pieces.

8. An apparatus adapted to adjust a drive shaft of a vehicle, said apparatus comprising:
   a powered driver carried on the vehicle for translating the drive shaft, said driver being powered by an electric motor and controlled by a controller, the drive shaft having at least two pieces, said controller receiving data to determine an angle between the first and second pieces; and
   a bearing supporting the drive shaft, said bearing being moved relative to the vehicle by said driver to adjust the angular position of the drive shaft.

9. An apparatus as described in claim 8, wherein said controller cuts off said driver when the vehicle is not moving.

10. An apparatus as described in claim 8, wherein said controller cuts off said driver in low torque conditions.

11. An apparatus as described in claim 8, wherein said controller receives a signal representative of the cargo loading of the vehicle.

12. A vehicular multiple piece drive shaft including a first and second piece angular adjustment mechanism, said mechanism comprising:
    a driver between the vehicle and the multiple piece drive shaft; and
    a bearing being moved relative to the vehicle by said driver to adjust the angular position of the drive shaft and supporting at least one piece of the drive shaft, said driver being powered by a motor.

13. A vehicular multiple piece drive shaft including a mechanism to adjust an angular position of the drive shaft, said mechanism comprising:
    a driver connected on a vehicle, said driver including a gear train; and
    a bearing being moved relative to the vehicle by said driver and supporting said first piece of the drive shaft, said driver being powered by a motor.

14. A mechanism as described in claim 13 wherein said gear train including a worm gear.

15. A vehicular multiple piece drive shaft including a mechanism to adjust an angular position of the drive shaft, said mechanism comprising:
    a driver connected on a vehicle; and
    a bearing being moved relative to the vehicle by said driver and supporting said first piece of the drive shaft, said driver being powered by a motor said motor being controlled by a controller.

16. An automotive vehicle having an engine, a transmission operatively connected with said engine, a drive axle, and a drive shaft having at least first and second pieces for torsionally coupling the transmission with the drive axle, the vehicle having a frame and a suspension system for suspending the frame from the drive axle, the automotive vehicle further comprising:

a driver adjacent to the frame; and a bearing adjacent to the driver and supporting one of said drive shaft pieces, said bearing being moved relative to the fame by said driver to angularly adjust the at least first piece relative to the second piece.

17. An automotive vehicle as described in claim 16, wherein said driver is powered by an electric motor.

18. An automotive vehicle as described in claim 16, wherein the driver includes a gear train.

19. An automotive vehicle having an engine, a transmission operatively connected with the engine, a drive axle, and a drive shaft including at least first and second pieces for torsionally coupling the transmission with the drive axle, the vehicle having a frame and a suspension system for suspending the frame from the drive axle, the automotive vehicle comprising:

a driver carried on the frame, said driver being powered by an electric motor, said motor being controlled by a controller; and a bearing being moved relative to the vehicle by the driver and supporting one of the drive shaft pieces to adjust the angular position of the drive shaft.

20. An automotive vehicle as described in claim 19, wherein said controller receives data to determine an angle between the first and second drive shaft pieces.

\* \* \* \* \*